April 14, 1931. N. STATHAM 1,800,966
FLEXIBLE FASTENER
Filed Aug. 1, 1925
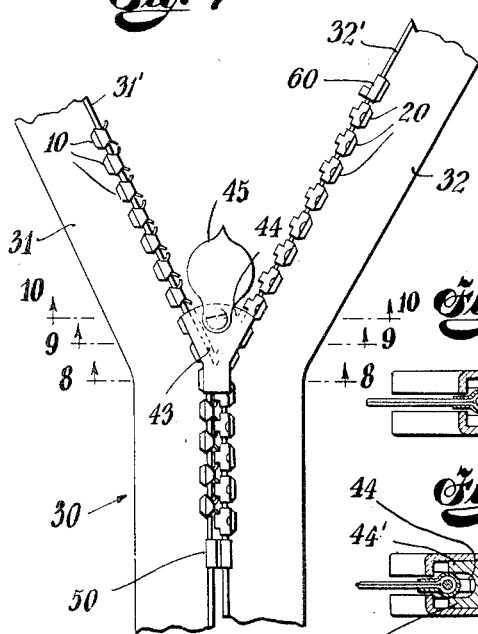
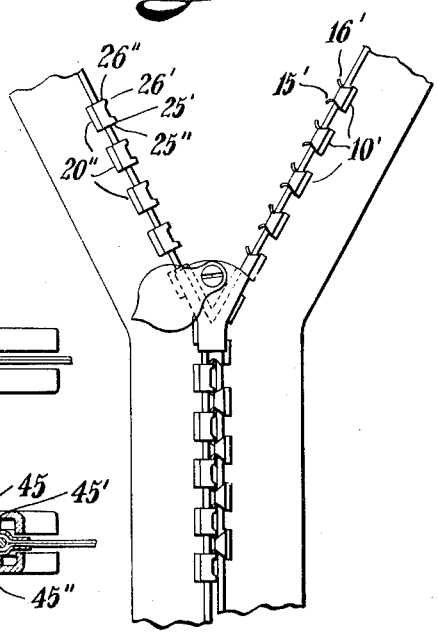

Patented Apr. 14, 1931

1,800,966

UNITED STATES PATENT OFFICE

NOEL STATHAM, OF IRVINGTON-UPON-HUDSON, NEW YORK

FLEXIBLE FASTENER

Application filed August 1, 1925. Serial No. 47,431.

My present invention relates to fasteners and flexible fastening devices embodying the same, and aims to devise articles of the general character specified which are simple in construction, easy and convenient to fabricate and to assemble, convenient in operation, and quite economical to manufacture, the fastener devices being characterized by their simplicity in construction and the ease and economy with which they may be embodied in flexible fastening devices of the present invention, and the flexible fastening devices embodying such fasteners being characterized by their simplicity in construction and their ease and convenience in operation. Other advantages of the present invention will in part be obvious to those skilled in the art to which the same relates and will in part be pointed out hereinafter.

In the accompanying specification I shall described, and in the annexed drawing show, illustrative embodiments of the fasteners and the flexible fastening devices of the present invention. It is, however, to be clearly understood that my invention is not limited to the specific embodiments thereof herein shown and described for purposes of illustration only.

Referring to the drawing, wherein I have illustrated the aforesaid illustrative embodiments of the present invention:

Fig. 1 is a view in side elevation of one of the male fasteners;

Fig. 2 is an end view of the same;

Fig. 3 is a top plan view of the same;

Fig. 4 is a view in side elevation of one of the female fasteners;

Fig. 5 is an end view of the same;

Fig. 6 is a top plan view of the same;

Fig. 7 is a plan view of a complete flexible fastening device made in accordance with the principles of the present invention and embodying the fasteners of Figs. 1 to 6, inclusive, of the drawings;

Fig. 8 is a cross sectional view of the same taken along line 8—8 of Fig. 7 of the drawing;

Fig. 9 is a cross sectional view of the same taken along line 9—9 of Fig. 7 of the drawing;

Fig. 10 is a cross sectional view of the same taken along line 10—10 of Fig. 7 of the drawing; and Fig. 11 is a plan view of a slightly modified structure constituting another illustrative embodiment of the present invention.

Referring now to the aforesaid illustrative embodiments of the present invention, and more particularly to Figs. 1 to 10, inclusive, of the drawing illustrating one of the same, 10 indicates one of the male fasteners comprising an intermediate portion 13 having converging corners 11 and 12 meeting the end edges thereof at their outer ends, the intermediate portion 13 constituting a bead-receiving recess, for a purpose to be subsequently described in considerable detail. Associated with the intermediate portion 13 are one or more hooks or prongs, here shown as a plurality of hooks or prongs 15 and 16. Preferably the hooks or prongs 15 and 16, of which two are here shown by way of illustration merely, are integral with the intermediate portion 13, as by being struck up therefrom. In fact, I prefer that the entire male fastener 10 shall be made of a single integral stamping of sheet metal. The hooks or prongs 15 and 16 preferably point in opposite directions and also preferably are directed in a direction substantially the same as the direction of longitudinal extent of the intermediate portion 13 of the fastener 10, as more clearly shown in Figs. 1, 2 and 3 of the drawing.

The female fastener, generally indicated by reference character 20, and shown more clearly in Figs. 4, 5 and 6 of the drawing, comprises an intermediate portion 23 constituting a socket receptive of the prongs 15 and 16, as will hereinafter become apparent, and depressed lateral portions 21 and 22 which are receptive of a beading, also as will hereinafter become apparent, I prefer that the entire fastener 20 shall be made of a single stamping of sheet metal or the like.

Referring now to Figs. 7, 8, 9 and 10 of the drawing illustrating the assembled flexible fastening device of the present invention, which device may be applied to the closures of boots, shoes, bags, tobacco pouches and articles of wearing apparel, as well as to other articles, the flexible fastening device therein illustrated and generally indicated by reference character 30 comprises a plurality of opposed flexible fastener-supporting tapes 31 and 32. I prefer that each of the tapes 31 and 32 shall be provided with a marginal bead or beaded edge portion indicated by reference characters 31' and 32', respectively. Mounted on the flexible tape 31, as by being carried by the beaded edge 31' thereof, are a series of male fasteners 10 corresponding to the fastener shown in Figs. 1, 2 and 3 of the drawing. For this purpose the male fasteners 10 have the beaded portion 31' of the tape 31 within the bead-receiving portions 13 of such fasteners. Mounted on the other tape 32, as by being carried on the beaded portion 32' of the same, are a series of female fasteners 20. For this purpose the female fasteners 20 have the beaded portion 32' of the tape 32 received within the bead-receiving portions 21 and 22 of such fasteners. The arrangement is such, and the fasteners 10 and 20 are so positioned on their respective carrying tapes 31 and 32, respectively, that when the flexible fastening device 30 as in closed position, the prongs 15 and 16 of the male fasteners 10 will fit into the sockets 23 of the female fasteners 20. It may here be stated that the conveying corners 11 and 12, of the fasteners 10, and the depressed lateral portions 21 and 22, of the fasteners 20, are clamped down upon the respective tapes 31 and 32 beyond the beaded portions 31' and 32', respectively, of the same to fix the position of the fasteners 10 and 20 on their respective tapes.

I provide means for operating the flexible fastening devices 30 from open into closed position, and vice versa. For this purpose I may employ a key, generally designated by reference character 40 and comprising the side plates 41 and 42, the intermediate spreading member 43, and the fastening member 44, to which may be attached a loop or handle 45 for manipulating the key 40 up and down along the flexible fastening device 30. The spreading member 43 serves to space and position the side plates 41 and 42. The side plate 41 is provided with the lateral flange portons 41' and 42', while the side plate 42 is provided with the lateral flanges 41" and 42". As more particularly shown in Figs. 8, 9 and 10 of the drawing the sides of the spreading member 43 are channeled, as at 44 and 45, to provide the shoulders 44' and 44" defining the channel 44 and the shoulders 45' and 45" defining the channel 45. The arrangement is such that when the spreading member 43 is moved into operative position along the flexible fastening device 30, the shoulders 44' and 44", and the shoulders 45' and 45" for example, of the operating member 40 will come into contact, respectively, with the marginal portions 13' of the intermediate portion 13 of the male fasteners 10 and the marginal portions 21' of the female fasteners 20 but without contacting with the prongs 15 and 16 of the same. This arrangement makes for a smoother and very accurate operation of the device and with a lesser tendency to deform the prongs or hooks 15 and 16.

The construction of the above fasteners and flexible fastening devices embodying the same has, it is believed, been made clear in the foregoing description. Likewise the manner of assembling the flexible fastening devices of the present invention has, it is believed, been made sufficiently clear in the foregoing description but may be briefly summarized as follows:—After the male fasteners 10 have been mounted on the fastener-carrying tape 31 by having the bead-receiving portions 13 of the same passed over the beaded edge portion 31' of the tape 31, and after the female fasteners 20 have been similarly mounted on the tape 32 by having the bead-receiving portions 21 and 22 of such fasteners passed over the beaded edge 32' of the tape 32, and with the fasteners properly positioned on their respective tapes, the key 40 is threaded over the open upper ends of the tapes 31 and 32 carrying the respective fasteners 10 and 20, the lower ends being closed by a staple 50. A stop 60 may now be applied to one of the tapes, such as the tape 32, to limit the upward movement of the key or operating member 40. In this position of the various parts, the main body portions of the tapes 31 and 32 pass out through the slots or lateral spaces provided between the flanges 41' and 42' on one side and the flanges 41" and 42" on the other side of the key or operating member 40. It may here be stated that the socket portion 23 of the female fasteners 20 is preferably of limited extent and is preferably positioned substantially centrally of the female fasteners 20. The arrangement is such as to permit of a very compact arrangement of both the male and female fasteners on their respective tapes and of such fasteners with respect to each other, the male fasteners being close to each other with only small spaces intervening on their supporting tape and the female fasteners likewise being close to each other with only small spaces intervening on their supporting tape, the male fasteners substantially over-lapping the female fasteners, and vice versa.

The manner of operating the flexible fastening devices of the present invention will be substantially clear from the foregoing description and may be briefly summarized as follows:—To operate the flexible fastening devices of the present invention into closed position, the key or operating member 40 is moved upwardly in the position shown in Fig. 7 of the drawing. This causes the successive fasteners to be brought into closed position by the engagement of the flange portions 41′ and 41″, and 42′ and 42″, of the side plates 41 and 42, respectively, with the marginal or edge portions of the intermediate portions 13 and 23 of the male and female fasteners 10 and 20, respectively. During this action prong after prong enters respective socket after socket, the spreading member during this operation acting merely as a guide for the proper angular positioning of the male and female fasteners 10 and 20 with respect to each other for this action. The movement of the key or operating member 40 is continued upwardly until the flexible fastening device 30 is completely closed.

In order to operate the flexible fastening device 30 into open position the key or operating member 40 is moved in the opposite direction, namely, downwardly in the position shown in Fig. 7 of the drawing. This action, by bringing the shoulders 44′ and 44″ of the spreading member 43, embodied in the operating member 40, into contact with the marginal portions of the intermediate portions 13 of the male fasteners 10, and by bringing about the angular positioning of the male fasteners 10 with respect to the female fasteners 20, opens the flexible fastening device. This action results from the removal of prong after prong from respective socket after socket by means of the angular positioning just referred to. The operation described is continued until the fastening device is completely opened. The upward movement of the key or operating member 40 is limited by the stop 60, just as its lower movement is limited by the rivet 50.

Referring now to Fig. 11 of the drawing illustrating a slightly modified form of the flexible fastening devices of the present invention, and constituting another illustrative embodiment of the same, the male fasteners 10′ here illustrated have the prongs 15′ and 16′ of the same spaced nearer the ends of the fasteners, while the female fasteners 20′ have the two spaced socket ends 25′ and 26′ containing the respective sockets 25″ and 26″. The fasteners themselves are spaced farther apart on their respective supporting tapes, otherwise the construction and mode of operation of the flexible fastening device in this figure of the drawing as well as the construction, application and use of the key for operating the same are substantially the same as in the case of the embodiment previously described.

The advantages of the present invention are numerous and of great practical importance. The invention is very simple in construction and may be easily, conveniently and economically fabricated and assembled. It is likewise easy and convenient in operation and thus lends itself to a wide variety of uses for which such devices are desired to be employed. It may here be stated that the cheapness of the article further extends its field of usefulness. Other advantages of the present invention will readily occur to those skilled in the art to which the same relates.

What I claim as my invention is:

1. In a multiple operated fastening device, a female fastener member comprising an intermediate portion provided with depressed lateral portions, said intermediate portion constituting a socket portion extending in substantially the same direction as the longitudinal extent of said depressed lateral portions.

2. In a multiple operated fastening device, a female fastener member comprising an intermediate portion provided with depressed lateral portions, said intermediate portion constituting a socket portion consisting of a plurality of oppositely directed connected sockets each extending in substantially the same direction as the direction of longitudinal extent of said depressed lateral portions.

3. In a multiple operated fastening device, a female fastener member comprising an intermediate portion having depressed lateral portions receptive of a beading, said intermediate portion constituting a socket portion comprising a plurality of oppositely directed connected sockets each extending in substantially the same direction as the direction of longitudinal extent of said depressed lateral portions.

4. In a multiple operated fastening device, a female fastener member comprising an intermediate portion provided with depressed lateral portions receptive of a beading, said intermediate portion constituting a socket portion comprising a socket extending in substantially the same direction as the direction of longitudinal extent of said depressed lateral portions.

5. A flexible fastener comprising a plurality of opposed cooperating flexible fastener-supporting tapes, one of said tapes carrying a series of female fasteners each comprising an intermediate portion provided with depressed lateral portions, said intermediate portion constituting a socket portion comprising a plurality of oppositely directed connected sockets each extending in substantially the same direction as the direction of longitudinal extent of said depressed lateral portions, and the other of said tapes carrying a series of male fasteners each comprising an intermediate portion provided with converging corners and a plurality of oppositely extending prongs associated with said intermediate portion and extending in substantially the same direction as the direction of longitudinal extent of said intermediate portion, in combination with an operating member associated with said fastener-supporting tapes and the fasteners carried thereby for causing said prongs to enter said sockets to close flexible fastener and to leave said sockets to open said flexible fastener.

6. A flexible fastened comprising a plurality of opposed cooperating flexible fastener-supporting tapes each provided with a marginal bead portion, one of said tapes carrying a series of female fasteners each comprising an intermediate portion provided with depressed lateral portions receptive of the marginal bead portion on said last mentioned tape, said intermediate portion constituting a socket portion provided with the plurality of oppositely directed connected sockets each extending in substantially the same direction as the direction of longitudinal extent of said intermediate bead-receiving portion, and the other of said tapes carrying a series of male fasteners each comprising an intermediate bead-receiving portion provided with converging corners for receiving the marginal bead portion of said last mentioned tape and a plurality of oppositely extending prongs associated with said intermediate bead-receiving portion and extending in substantially the same direction as the direction of longitudinal extent of said intermediate bead-receiving portion, in combination with an operating member associated with said fastener-supporting tapes for causing said prongs to enter said sockets to close said flexible fasteners and to leave said sockets to open said flexible fastener.

7. A flexible fastener comprising a plurality of opposed cooperating flexible fastener-supporting tapes, one of said tapes carrying a series of female fasteners each comprising an intermediate portion provided with depressed lateral portions, said intermediate portion constituting a socket portion comprising a plurality of oppositely directed connected sockets each extending in substantially the same direction as the direction of longitudinal extent of said depressed lateral portions, and the other of said tapes carrying a series of male fasteners each comprising an intermediate portion provided with converging corners and a plurality of oppositely extending prongs associated with said intermediate portion and extending in substantially the same direction as the direction of longitudinal extent of said intermediate portion, in combination with an operating member associated with said fastener-supporting tapes and the fasteners carried thereby for causing said prongs to enter said sockets to close flexible fastener and to leave said sockets to open said flexible fastener, said operating member being provided with a portion engaging the converging corners of said male fastening members without engaging the prongs of the same.

8. A flexible fastener comprising a plurality of opposed cooperating flexible fastener-supporting tapes each provided with a marginal bead portion, one of said tapes carrying a series of female fasteners each comprising an intermediate portion provided with depressed lateral portions receptive of the marginal bead portion on said last mentioned tape, said intermediate portion constituting a socket portion provided with the plurality of oppositely directed connected sockets each extending in substantially the same direction as the direction of longitudinal extent of said intermediate bead-receiving portion, and the other of said tapes carrying a series of male fasteners each comprising an intermediate bead-receiving portion provided with converging corners for receiving the marginal bead portion of said last mentioned tape and a plurality of oppositely extending prongs associated with said intermediate bead-receiving portion and extending in substantially the same direction as the direction of longitudinal extent of said intermediate bead-receiving portion, in combination with an operating member associated with said fastener-supporting tapes for causing said prongs to enter said sockets to close said flexible fasteners and to leave said sockets to open said flexible fastener, said operating member being provided with a portion engaging the converging corners of said male fastening members without engaging the prongs of the same.

In testimony whereof, I have signed my name to this specification this 15th day of July, 1925.

NOEL STATHAM.